United States Patent
Lee et al.

(10) Patent No.: US 11,346,931 B2
(45) Date of Patent: May 31, 2022

(54) METHOD FOR ESTIMATING LOCATION OF TERMINAL IN WIRELESS COMMUNICATION SYSTEM AND APPARATUS THEREFOR

(71) Applicant: LG ELECTRONICS INC., Seoul (KR)

(72) Inventors: Woonghee Lee, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/972,567

(22) PCT Filed: Jun. 18, 2019

(86) PCT No.: PCT/KR2019/007324
§ 371 (c)(1),
(2) Date: Dec. 4, 2020

(87) PCT Pub. No.: WO2019/245258
PCT Pub. Date: Dec. 26, 2019

(65) Prior Publication Data
US 2021/0239820 A1 Aug. 5, 2021

(30) Foreign Application Priority Data
Jun. 18, 2018 (KR) .......................... 10-2018-0069372

(51) Int. Cl.
*H04W 8/00* (2009.01)
*G01S 13/08* (2006.01)

(52) U.S. Cl.
CPC .................................. *G01S 13/08* (2013.01)

(58) Field of Classification Search
CPC ... H04W 56/0015; H04W 4/02; H04W 64/00; H04W 4/005; H04W 4/023; H04W 4/029; G01S 13/08; G01S 5/0215; G01S 5/14
(Continued)

(56) References Cited

U.S. PATENT DOCUMENTS

2012/0026940 A1* 2/2012 Barbieri ................ H04W 24/10
370/328
2017/0356979 A1* 12/2017 Georgiou .............. G01S 5/0215

FOREIGN PATENT DOCUMENTS

KR 101160085 6/2012
KR 1020140058983 5/2014
(Continued)

OTHER PUBLICATIONS

PCT International Application No. PCT/KR2019/007324, International Search Report dated Oct. 17, 2019, 3 pages.

*Primary Examiner* — Phuoc H Doan
(74) *Attorney, Agent, or Firm* — Lee, Hong, Degerman, Kang & Waimey PC

(57) ABSTRACT

A method of estimating, by a user equipment (UE), a location of the UE in a wireless communication system is disclosed. The method includes measuring distances between a plurality of anchor nodes and the UE; creating a first matrix using values of the measured distances; creating a third matrix based on the first matrix and a second matrix, the second matrix being a centering matrix; and estimating the location of the UE based on a result of comparing a first value generated based on eigenvalues of the third matrix with a second value that is a pre-defined reference value, wherein when the first value is greater than the second value, all the measured distances are distances measured through a line of sight (LOS) path, wherein when the first value is less than the second value, some of the measured distances are (Continued)

distances measured through a non-line of sight (NLOS) path.

12 Claims, 6 Drawing Sheets

(58) Field of Classification Search
USPC .......................... 455/456.6, 456.1; 370/350
See application file for complete search history.

(56) References Cited

FOREIGN PATENT DOCUMENTS

| KR | 101544315 | 8/2015 |
|---|---|---|
| KR | 1020160024034 | 3/2016 |
| KR | 1020180046080 | 5/2018 |

* cited by examiner

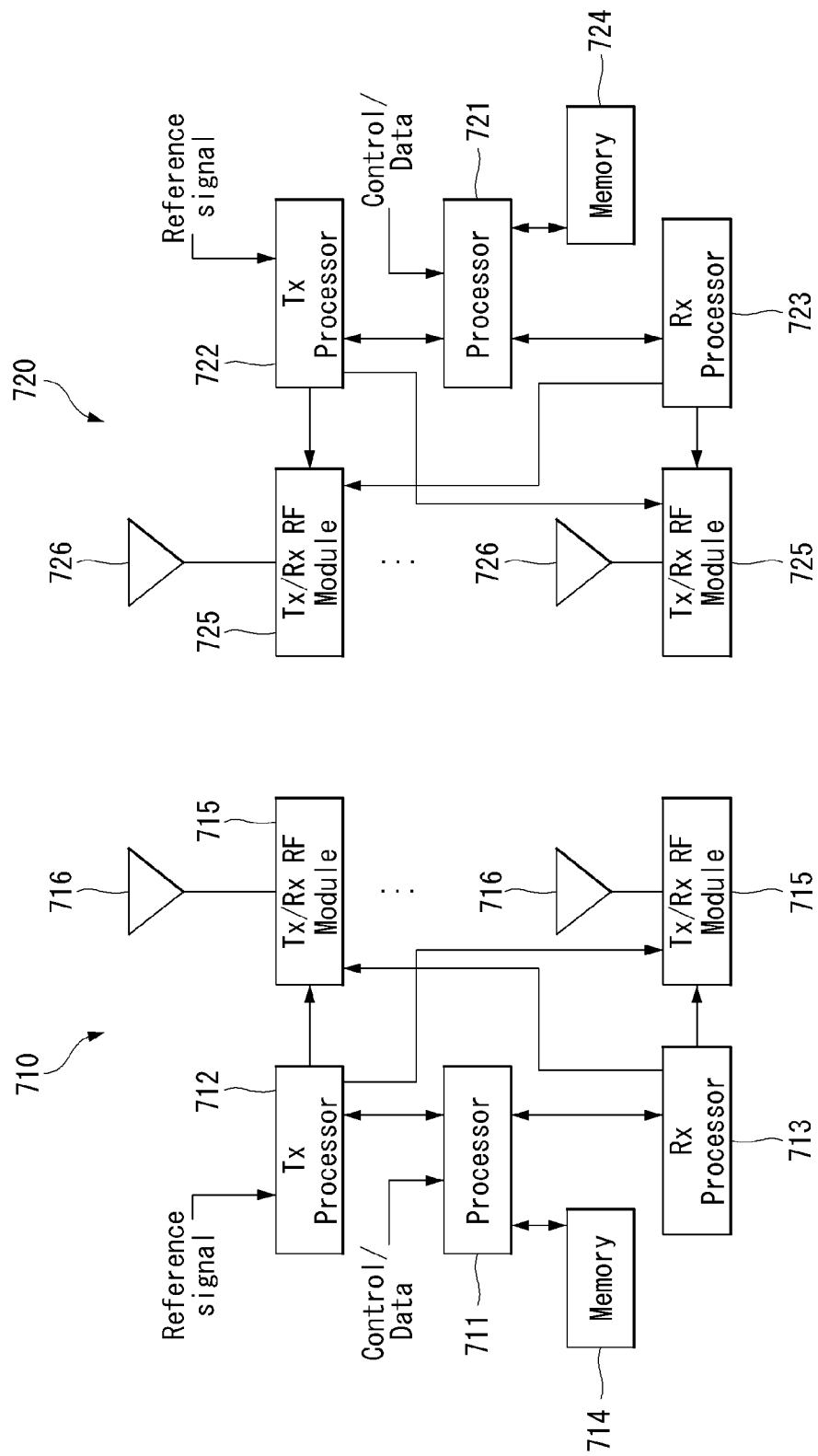

METHOD FOR ESTIMATING LOCATION OF TERMINAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2019/007324, filed on Jun. 18, 2019, which claims the benefit of earlier filing date and right of priority to Korean Patent Application No. 10-2018-0069372, filed on Jun. 18, 2018, the contents of which are incorporated by reference herein in their entirety.

TECHNICAL FIELD

The present disclosure relates to a wireless communication system, and more particularly to a method for estimating a location of a user equipment (UE) and a device supporting the same.

BACKGROUND ART

A mobile communication system has been developed to provide a voice service while ensuring an activity of a user. However, in the mobile communication system, not only a voice but also a data service is extended. At present, due to an explosive increase in traffic, there is a shortage of resources and users demand a higher speed service, and as a result, a more developed mobile communication system is required.

Requirements of a next-generation mobile communication system should be able to support acceptance of explosive data traffic, a dramatic increase in per-user data rate, acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

An object of the present disclosure is to provide a method for estimating a location of a user equipment (UE).

Another object of the present disclosure is to provide a method for estimating a location of a UE using a distance between anchor nodes and the UE.

Another object of the present disclosure is to provide a method for checking whether a NLOS path is included upon measurement of a distance between anchor nodes and the UE.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

In one aspect, there is provided a method of estimating a location of a user equipment (UE) in a wireless communication system.

Specifically, the method performed by the UE comprises measuring distances between a plurality of anchor nodes and the UE; creating a first matrix using values of the measured distances; creating a third matrix based on the first matrix and a second matrix, wherein the second matrix is a centering matrix; and estimating the location of the UE based on a result of comparing a first value generated based on eigenvalues of the third matrix with a second value that is a pre-defined reference value, wherein when the first value is greater than the second value, all the measured distances are distances measured through a line of sight (LOS) path, wherein when the first value is less than the second value, some of the measured distances are distances measured through a non-line of sight (NLOS) path.

The first value is a value determined by the following Equation:

$$\frac{\lambda_{D+1}}{\sqrt{\sum_{k=1}^{D+1} \lambda_k}} \quad \text{[Equation]}$$

where $\lambda_k$ is the eigenvalue of the third matrix, D is a dimension of a space in which the UE is located, and k is an integer.

The second value is a distance resolution.

Elements of the first matrix are values generated by squaring the values of the measured distances.

The third matrix is created by the following Equation:

$$-\text{second matrix} \times \text{first matrix} \times \text{second matrix} \div 2 \quad \text{[Equation]}$$

The method further comprises sending a base station a location of one or more anchor nodes at which the first value is a minimum value; and sending the base station the minimum value of the first value.

In another aspect, there is provided a user equipment (UE) estimating a location of the UE in a wireless communication system, the UE comprising a radio frequency (RF) module configured to transmit and receive a radio signal; and a processor functionally connected to the RF module, wherein the processor is configured to measure distances between a plurality of anchor nodes and the UE; create a first matrix using values of the measured distances; create a third matrix based on the first matrix and a second matrix, wherein the second matrix is a centering matrix; and estimate the location of the UE based on a result of comparing a first value generated based on eigenvalues of the third matrix with a second value that is a pre-defined reference value, wherein when the first value is greater than the second value, all the measured distances are distances measured through a line of sight (LOS) path, wherein when the first value is less than the second value, some of the measured distances are distances measured through a non-line of sight (NLOS) path.

The first value is a value determined by the following Equation:

$$\frac{\lambda_{D+1}}{\sqrt{\sum_{k=1}^{D+1} \lambda_k}} \quad \text{[Equation]}$$

where $\lambda_k$ is the eigenvalue of the third matrix, D is a dimension of a space in which the UE is located, and k is an integer.

The second value is a distance resolution.

Elements of the first matrix are values generated by squaring the values of the measured distances.

The third matrix is created by the following Equation:

−second matrix×first matrix×second matrix÷2   [Equation]

The processor is further configured to send a base station a location of one or more anchor nodes at which the first value is a minimum value, and send the base station the minimum value of the first value.

Advantageous Effects

The present disclosure has an effect of estimating a location of a UE using a distance between anchor nodes and the UE.

The present disclosure has an effect of more accurately estimating a location of a UE by checking whether a NLOS path is included upon measurement of a distance between anchor nodes and the UE.

It will be appreciated by persons skilled in the art that the effects that could be achieved with the present disclosure are not limited to those that have been described hereinabove and other effects and advantages of the present disclosure will be more clearly understood by a person skilled in the art to which the present disclosure pertains, from the following detailed description.

DESCRIPTION OF DRAWINGS

The accompany drawings, which are included as part of the detailed description in order to help understanding of the present disclosure, provide embodiments of the present disclosure and describe the technical characteristics of the present disclosure along with the detailed description.

FIG. 7 illustrates another example of a block configuration diagram of a wireless communication device to which methods described in the present disclosure are applicable.

MODE FOR INVENTION

Figure 1:
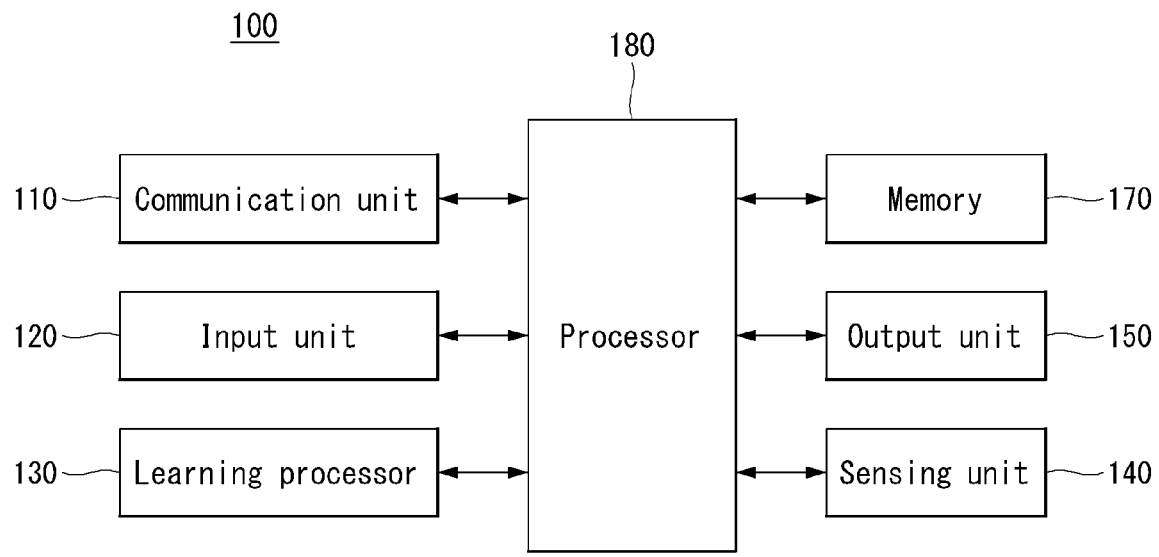
FIG. 1 is a diagram showing an AI device to which a method proposed in this specification may be applied.

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the present disclosure, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Further, 5G new radio (NR) defines enhanced mobile broadband (eMBB), massive machine type communications (mMTC), ultra-reliable and low latency communications (URLLC), and vehicle-to-everything (V2X) based on usage scenario.

A 5G NR standard is divided into standalone (SA) and non-standalone (NSA) depending on co-existence between a NR system and a LTE system.

The 5G NR supports various subcarrier spacings and supports CP-OFDM in the downlink and CP-OFDM and DFT-s-OFDM (SC-OFDM) in the uplink.

Embodiments of the present disclosure can be supported by standard documents disclosed in at least one of IEEE 802, 3GPP, and 3GPP2 which are the wireless access systems. That is, steps or parts in embodiments of the present disclosure which are not described to clearly show the technical spirit of the present disclosure can be supported by the standard documents. Further, all terms described in the present disclosure can be described by the standard document.

3GPP LTE/LTE-A/New RAT (NR) is primarily described for clear description, but technical features of the present disclosure are not limited thereto.

In the present specification, 'A and/or B' may be interpreted in the same sense as 'including at least one of A or B'.

Hereinafter, examples of 5G use scenarios to which a method proposed in this specification may be applied are described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 is a diagram showing an AI device 100 to which a method proposed in this specification may be applied.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

Figure 2:
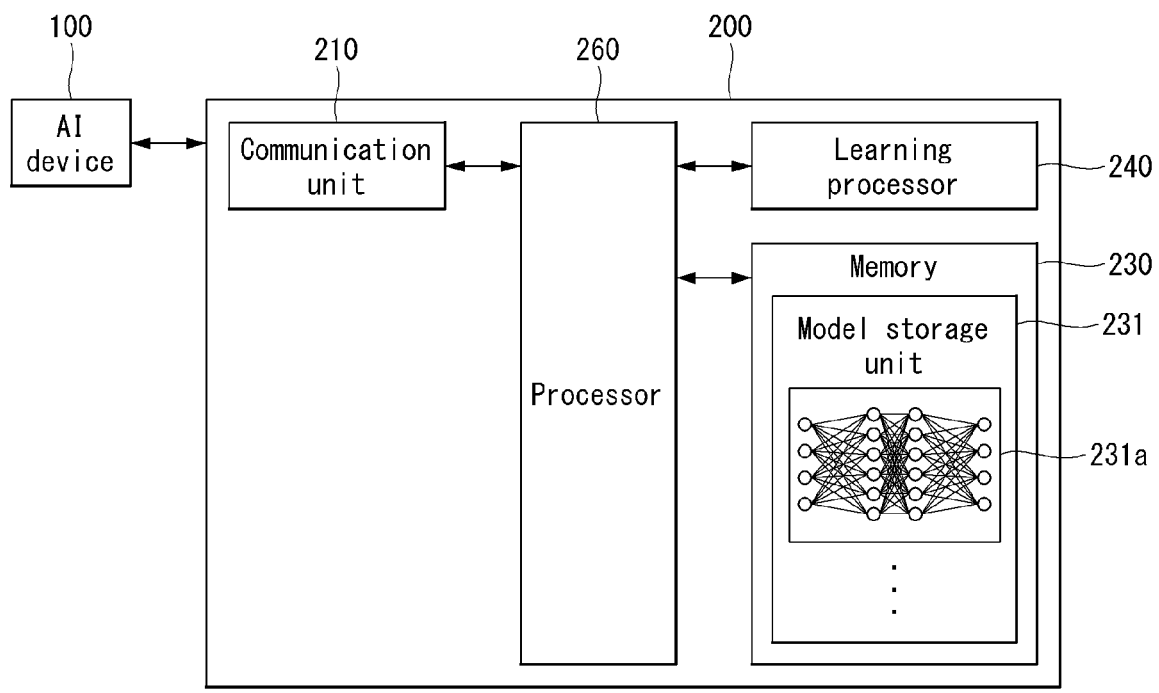
FIG. 2 is a diagram showing an AI server to which a method proposed in this specification may be applied.

FIG. 2 is a diagram showing the AI server 200 to which a method proposed in this specification may be applied.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

Figure 3:
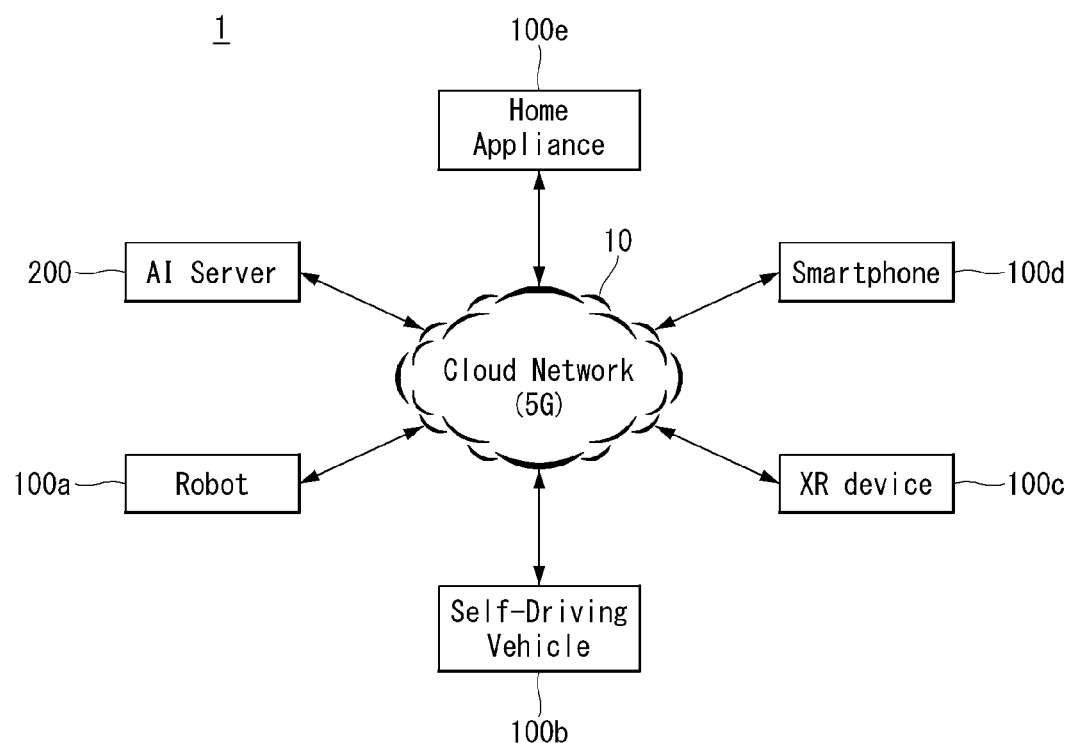
FIG. 3 is a diagram showing an AI system to which a method proposed in this specification may be applied.

FIG. 3 is a diagram showing an AI system 1 to which a method proposed in this specification may be applied.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

AI+Robot

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/ interaction. In this case, the robot 100a may obtain intention information of an interaction according to a user's behavior or voice speaking, may determine a response based on the obtained intention information, and may perform an operation.

AI+Self-Driving

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI+XR

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI+Robot+Self-Driving

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

DEFINITION OF TERMS eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Numerology: The numerology corresponds to one sub-carrier spacing in a frequency domain. By scaling a reference subcarrier spacing by an integer N, different numerologies can be defined.

NR: NR radio access or new radio.

General System

Figure 4:
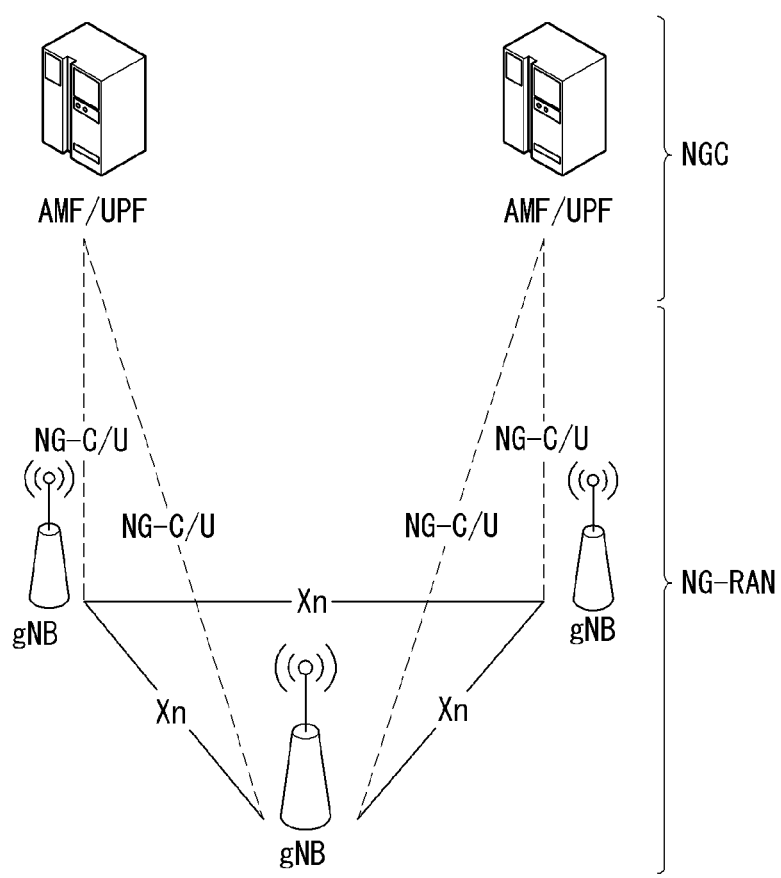
FIG. 4 is a diagram showing an example of a general system configuration of NR to which a method proposed in this specification may be applied.

FIG. 4 illustrates an example of an overall structure of a NR system to which a method proposed by the present specification is applicable.

Referring to FIG. 4, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to an access and mobility management function (AMF) via an N2 interface and a User Plane Function (UPF) via an N3 interface.

In the related art, there were methods for estimating a location of the UE by using power or by measuring a distance between several nodes and the UE.

These methods had a problem in that they should estimate the UE's location by statisticalizing a large number of measured distance data and should collect a large number of distance measurement data in order to increase accuracy.

These methods had a problem in that they should use data on a specific environment in order to statisticalize distance measurement data and cannot use data measured when data is out of the specific environment.

The present disclosure proposes a line of sight (LoS)/non-line of sight (NLoS) identification method using low rank property of a double-centered Euclidean distance matrix (EDM), in order to solve the above-described problems, improve reliability of a ranging (distance measurement) value between multiple nodes, and improve positioning accuracy based on this.

Matrixes used for a method for estimating a UE's location described in the present disclosure and rank property of each matrix are as follows.

i) Pairwise Distance Matrix

Respective elements R(i,j) of a pairwise distance matrix consist of dij, and rank property of the pairwise distance matrix is full rank.

Herein, full rank means that in a matrix with m×n size, n is a rank of the matrix if m>n, m is a rank of the matrix if m<n, and m (or n) is a rank of the matrix if m=n.

ii) Euclidean Distance Matrix (EDM)

Respective elements EDM(i,j) of an EDM consist of (dij)^2, and rank property of the EDM is a rank of D+2.

iii) Double-Centered EDM

A double-centered EDM is given by the following Equation 1, and rank property of the double-centered EDM is D rank.

$$-H \times EDM \times H/2 \qquad \text{[Equation 1]}$$

In the above Equation, D is a dimension of a geometric space, i.e., a dimension of a space in which the UE is located, N is the number of nodes, and H is a centering matrix.

Further, H is $I_N - (1/N) \times 1_N 1_N^T$, where matrix $1_N$ is $[1\ 1\ 1\ \ldots\ 1\ 1]^T$.

The matrix is $1_N$ an N by 1 matrix, and the matrix $1_N$ refers to an N by N identity matrix.

Further, dij is a distance between a node i and a node j.

A method for estimating a UE's location described in the present disclosure is described in detail below.

Before the description, it is assumed that ranging has been performed using a time-of-flight, i.e., a time required to emit and reflect light.

In addition, a distance resolution (DR) in the present disclosure is a value by dividing the speed of light by a sampling rate.

Herein, the distance resolution refers to a minimum distance at which two objects separated in the same direction can be identified as two objects not one object.

(Method 1)

This method identifies whether LoS/NLoS path exists between multiple nodes by using characteristics of eigenvalues of a double-centered EDM.

That is, this method identifies whether ranging values measured between multiple nodes are measured using only the LoS path or measured using both the LoS and NLoS paths.

Specifically, if a distance resolution is zero, this method can identify whether the LoS/NLoS path exists through the above-described rank property (e.g., based on whether there is a (D+1)-th eigenvalue of the double-centered EDM).

(Method 2)

However, even if all ranging values measured between multiple nodes are obtained through the LoS path, there is a problem in that rank condition cannot be immediately applied because a sampling error occurs.

Thus, a method is proposed, which identifies whether the LoS/NLoS path exists using eigenvalues) of a double-centered EDM.

To this end, a separate function is defined as the following Equation 2.

$$\frac{\lambda_{D+1}}{\sqrt{\sum_{k=1}^{D+1} \lambda_k}} \qquad \text{[Equation 2]}$$

In this case, the above Equation 2 may be expressed as a cost function for hypothesis test, and this represents a distance at which a (D+1)-dimension occurs due to a ranging error of a signal in the NLoS path.

Hereinafter, a detailed method is described, which determines whether ranging has been performed including the NLoS path when performing the ranging between multiple nodes using the above Equation 2.

When eigenvalues of the double-centered EDM consisting of ranging values between N nodes are (λ1, λ2, λ3, . . . ), it may be determined that ranging in all links has been performed through the LoS path if $$\frac{\lambda_{D+1}}{\sqrt{\sum_{k=1}^{D+1} \lambda_k}}$$

is greater than a distance resolution.

On the other hand, if $$\frac{\lambda_{D+1}}{\sqrt{\sum_{k=1}^{D+1} \lambda_k}}$$

is less man me distance resolution, it may be determined that the ranging value measured through the NLoS path exists.

Using the above-described methods, a UE's location can be estimated both indoors and outdoors, and the UE can select and collect distance information measured with multiple nodes.

In order to perform these methods, an absolute location of the UE can be gasped through ranging between the UE and anchor nodes.

In this instance, the multiple nodes may be expressed as anchor nodes, and the anchor nodes mean nodes that know their location in advance.

Examples of the anchor nodes may include beacon, road side unit (RSU), or gNB.

On LTE positioning protocol (LPP), the UE may report, to the gNB, a set of gNB indexes constructing a double-centered EDM that allows $$\frac{\lambda_{D+1}}{\sqrt{\sum_{k=1}^{D+1} \lambda_k}}$$

using eigenvalues ($\lambda 1$, $\lambda 2$, $\lambda 3$, . . . ) of a double-centered EDM constructed through a pairwise distance between the UE and any gNBs to be a minimum value.

The gNB when $$\frac{\lambda_{D+1}}{\sqrt{\sum_{k=1}^{D+1} \lambda_k}}$$

has the minimum value may mean gNBs making the LoS link together with the UE, or gNBs with the highest reliability from UE positioning perspective.

In addition, the UE may report, to the gNB, the corresponding $$\frac{\lambda_{D+1}}{\sqrt{\sum_{k=1}^{D+1} \lambda_k}}$$

(representing reliability of the UE positioning) of this case.

By using the methods described in the present disclosure, there is an effect that positioning with higher accuracy is possible than when the UE assumes all the ranging signals as LoS and then estimates a UE's location.

The respective embodiments or the respective methods described above can be separately performed, or the method described in the present disclosure can be implemented through a combination of one or more embodiments or methods.

Figure 5:
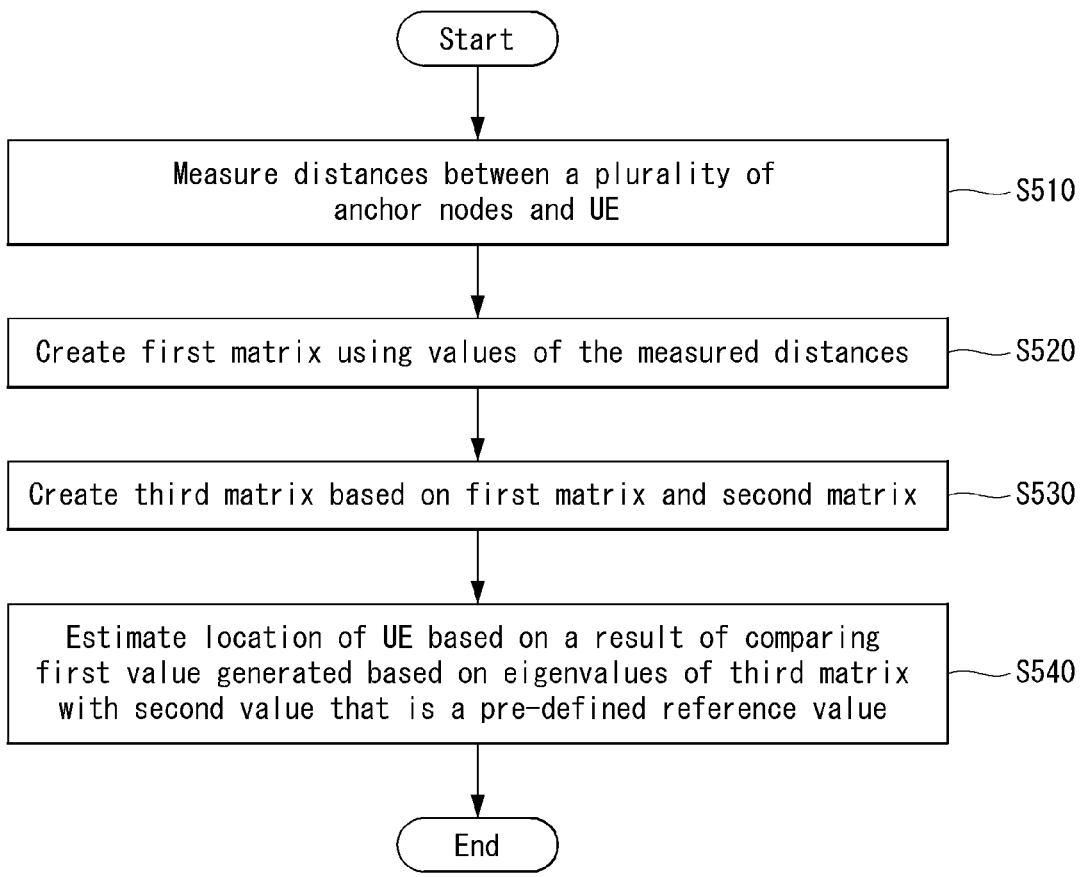
FIG. 5 is a flow chart illustrating an operation method of a UE performing a method for estimating a location of the UE described in the present disclosure.

FIG. 5 is a flow chart illustrating an operation method of a UE performing a method described in the present disclosure.

More specifically, FIG. 5 illustrates an operation method of a UE performing a method for estimating a UE's location in a wireless communication system.

First, a UE measures distances between a plurality of anchor nodes and the UE in S510.

Next, the UE creates a first matrix using values of the measured distances in S520, and creates a third matrix based on the first matrix and a second matrix in S530.

In this instance, the second matrix may be a centering matrix.

The UE estimates a location of the UE based on a result of comparing a first value generated based on eigenvalues of the third matrix with a second value that is a pre-defined reference value in S540.

When the first value is greater than the second value, all the measured distances may be distances measured through a line of sight (LOS) path. When the first value is less than the second value, some of the measured distances may be distances measured through a non-line of sight (NLOS) path.

The first value may be a value determined by the above Equation 2.

The second value may be a distance resolution.

Elements of the first matrix may be values generated by squaring the values of the measured distances.

The third matrix may be created by the following Equation 3.

$$-\text{second matrix} \times \text{first matrix} \times \text{second matrix} \div 2 \quad \text{[Equation 3]}$$

The UE may send a base station a location of one or more anchor nodes, at which the first value is a minimum value, and may send the base station the minimum value of the first value.

Figure 6:
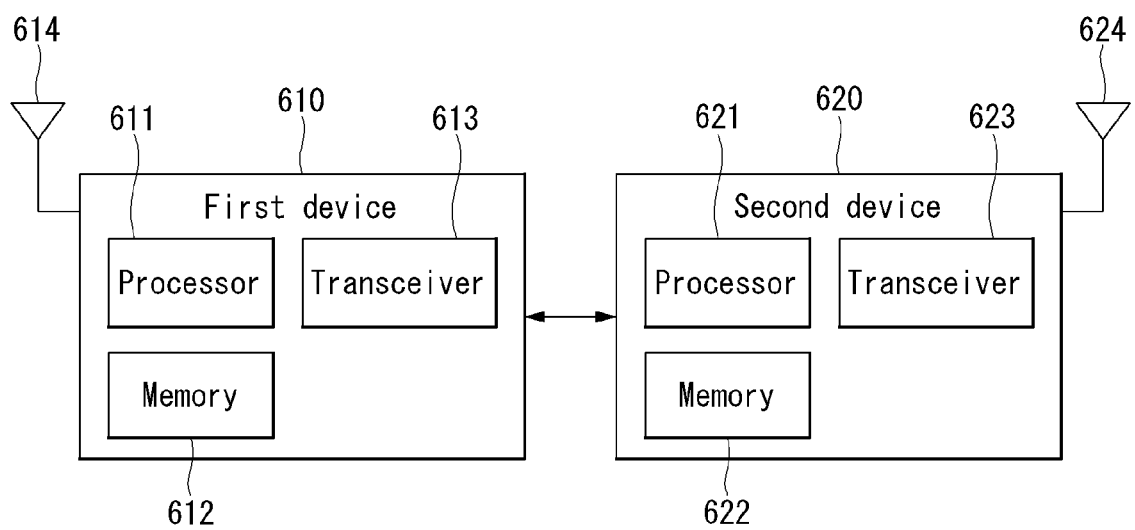
FIG. 6 illustrates an example of a block configuration diagram of a wireless communication device to which methods described in the present disclosure are applicable.

With reference to FIGS. 6 and 7, the following is described that a method for estimating a UE's location described in the present disclosure is implemented at the UE.

A UE estimating a location of the UE in a wireless communication system may include a radio frequency (RF) module configured to transmit and receive a radio signal, and a processor functionally connected to the RF module.

First, the processor of the UE controls the RF module to measure distances between a plurality of anchor nodes and the UE.

The processor of the UE controls the RF module to create a first matrix using values of the measured distances and to create a third matrix based on the first matrix and a second matrix.

In this instance, the second matrix may be a centering matrix.

The processor of the UE controls the RF module to estimate a location of the UE based on a result of comparing a first value generated based on eigenvalues of the third matrix with a second value that is a pre-defined reference value.

When the first value is greater than the second value, all the measured distances may be distances measured through a line of sight (LOS) path. When the first value is less than the second value, some of the measured distances may be distances measured through a non-line of sight (NLOS) path.

The first value may be a value determined by the above Equation 2.

The second value may be a distance resolution.

Elements of the first matrix may be values generated by squaring the values of the measured distances.

The third matrix may be created by the above Equation 3.

The processor of the UE may control the RF module to send a base station a location of one or more anchor nodes, at which the first value is a minimum value, and to send the base station the minimum value of the first value.

Overview of Device to which the Present Disclosure is Applicable

Hereinafter, devices to which the present disclosure is applicable are described.

FIG. 6 illustrates a wireless communication device according to an embodiment of the present disclosure.

Referring to FIG. 6, a wireless communication system may include a first device 610 and a second device 620.

The first device 610 may be a base station, a network node, a transmitter UE, a receiver UE, a wireless device, a wireless communication device, a vehicle, a vehicle with an autonomous driving function, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G services, or a device related to the fourth industrial revolution field, or the like.

The second device 620 may be a base station, a network node, a transmitter UE, a receiver UE, a wireless device, a wireless communication device, a vehicle, a vehicle with an autonomous driving function, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G services, or a device related to the fourth industrial revolution field, or the like.

For example, the UE may include a cellular phone, a smart phone, a laptop computer, a digital broadcast terminal, a personal digital assistant (PDA), a portable multimedia player (PMP), a navigator, a slate PC, a tablet PC, an ultrabook, a wearable device (e.g., a smart watch, a smart glass, a head mounted display (HMD)), or the like. For example, the HMD may be a display device worn on the head. For example, the HMD may be used to implement the VR, AR, or MR device.

For example, the drone may be a flight vehicle that flies by a radio control signal without a person being on the flight vehicle. For example, the VR device may include a device that implements an object or a background, etc. of a virtual world. For example, the AR device may include a device implemented by connecting an object or a background of a virtual world to an object or a background, etc. of a real world. For example, the MR device may include a device implemented by merging an object or a background of a virtual world with an object or a background, etc. of a real world. For example, the hologram device may include a device that records and reproduces stereoscopic information to implement a 360-degree stereoscopic image by utilizing a phenomenon of interference of light generated when two laser beams called holography meet. For example, the public safety device may include a video relay device or a video device that can be worn on the user's body. For example, the MTC device and the IoT device may be a device that does not require a person's direct intervention or manipulation. For example, the MTC device and the IoT device may include a smart meter, a vending machine, a thermometer, a smart bulb, a door lock, a variety of sensors, or the like. For example, the medical device may be a device used for the purpose of diagnosing, treating, alleviating, handling or preventing a disease. For example, the medical device may be a device used for the purpose of diagnosing, treating, alleviating or correcting an injury or a disorder. For example, the medical device may be a device used for the purpose of testing, substituting or modifying a structure or a function. For example, the medical device may be a device used for the purpose of controlling pregnancy. For example, the medical device may include a medical device, a surgical device, a (in vitro) diagnostic device, a hearing aid or a device for a surgical procedure, and the like. For example, the security device may be a device installed to prevent a possible danger and to maintain safety. For example, the security device may include a camera, CCTV, a recorder, or a black box, and the like. For example, the FinTech device may be a device capable of providing financial services, such as mobile payment. For example, the FinTech device may include a payment device, point of sales (POS), or the like. For example, the climate/environment device may include a device for monitoring and predicting the climate/environment.

The first device 610 may include at least one processor such as a processor 611, at least one memory such as a memory 612, and at least one transceiver such as a transceiver 613. The processor 611 may perform functions, procedures, and/or methods described above. The processor 611 may perform one or more protocols. For example, the processor 611 may perform one or more layers of a radio interface protocol. The memory 612 is connected to the processor 611 and may store various types of information and/or instructions. The transceiver 613 is connected to the processor 611 and may be configured to transmit and receive radio signals.

The second device 620 may include at least one processor such as a processor 621, at least one memory such as a memory 622, and at least one transceiver such as a transceiver 623. The processor 621 may perform functions, procedures, and/or methods described above. The processor 621 may perform one or more protocols. For example, the processor 621 may perform one or more layers of a radio interface protocol. The memory 622 is connected to the processor 621 and may store various types of information and/or instructions. The transceiver 623 is connected to the processor 621 and may be configured to transmit and receive radio signals.

The memory 612 and/or the memory 622 may be connected inside or outside the processor 611 and/or the processor 621, respectively, and may be connected to another processor through various technologies, such as a wired or wireless connection.

The first device 610 and/or the second device 620 may have one or more antennas. For example, an antenna 614 and/or an antenna 624 may be configured to transmit and receive radio signals.

FIG. 7 illustrates another example of a block configuration diagram of a wireless communication device to which methods described in the present disclosure are applicable.

Referring to FIG. 7, a wireless communication system includes a base station 710 and multiple UEs 720 located in an area of the base station. The base station 710 may be represented by a transmitter, and the UE 720 may be represented by a receiver, or vice versa. The base station 710 and the UE 720 respectively include processors 711 and 721, memories 714 and 724, one or more Tx/Rx RF modules 715 and 725, Tx processors 712 and 722, Rx processors 713 and 723, and antennas 716 and 726. The processors implement functions, processes, and/or methods described above. More specifically, in DL (communication from the base station to the UE), an upper layer packet from a core network is provided to the processor 711. The processor implements functionality of the L2 layer. In the DL, the processor provides the UE 720 with multiplexing between a logical channel and a transport channel and radio resource allocation, and is also responsible for signaling to the UE 720. The transmit (Tx) processor 712 implements various signal processing functions for the L1 layer (i.e., physical layer). The signal processing functions include coding and interleaving to facilitate forward error correction (FEC) at the UE. The coded and modulated symbols are split into parallel streams, and each stream is mapped to an OFDM subcarrier, multiplexed with a reference signal (RS) in time and/or frequency domain, and combined together using an Inverse Fast Fourier Transform (IFFT) to produce a physical channel carrying a time domain OFDMA symbol stream. The OFDMA stream is spatially precoded to produce multiple spatial streams. Each spatial stream may be provided to the different antenna 716 via a separate Tx/Rx module (or transceiver 715). Each Tx/Rx module may modulate an RF carrier with a respective spatial stream for transmission. At the UE, each Tx/Rx module (or transceiver 725) receives a signal through the respective antenna 726 of each Tx/Rx module. Each Tx/Rx module recovers information modulated onto an RF carrier and provides the information to the receive (Rx) processor 723. The RX processor implements various signal processing functions of the Layer 1. The Rx processor may perform spatial processing on the information to recover any spatial stream destined for the UE. If multiple spatial streams are destined for the UE, they may be combined into a single OFDMA symbol stream by the multiple Rx processors. The Rx processor converts the OFDMA symbol stream from the time domain to the frequency domain using a Fast Fourier Transform (FFT). The frequency domain signal includes a separate OFDMA symbol stream for each subcarrier of the OFDM signal. The symbols on each subcarrier and the reference signal are recovered and demodulated by determining the most likely signal constellation points transmitted by the base station. These soft decisions may be based on channel estimation values. The soft decisions are decoded and de-interleaved to recover data and control signals that have been originally transmitted by the base station on the physical channel. The corresponding data and control signals are provided to the processor 721.

UL (communication from the UE to the base station) is processed at the base station 710 in a manner similar to the description associated with a receiver function at the UE 720. Each Tx/Rx module 725 receives a signal through the respective antenna 726. Each Tx/Rx module provides an RF carrier and information to the Rx processor 723. The processor 721 may be associated with the memory 724 that stores a program code and data. The memory may be referred to as a computer readable medium.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute an embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

INDUSTRIAL APPLICABILITY

Although the present disclosure has been described focusing on examples applying to the 3GPP LTE/LTE-A/NR system, it can be applied to various wireless communication systems other than the 3GPP LTE/LTE-A/NR system.

What is claimed is:

1. A method of estimating, by a user equipment (UE), a location of the UE in a wireless communication system, the method comprising:
measuring distances between a plurality of anchor nodes and the UE;
creating a first matrix using values of the measured distances;
creating a third matrix based on the first matrix and a second matrix,
wherein the second matrix is a centering matrix; and
estimating the location of the UE based on a result of comparing a first value generated based on eigenvalues of the third matrix with a second value that is a pre-defined reference value,
wherein when the first value is greater than the second value, all the measured distances are distances measured through a line of sight (LOS) path,
wherein when the first value is less than the second value, some of the measured distances are distances measured through a non-line of sight (NLOS) path.

2. The method of claim 1, wherein the first value is a value determined by the following Equation:

$$\frac{\lambda_{D+1}}{\sqrt{\sum_{k=1}^{D+1} \lambda_k}}$$ [Equation]

where $\lambda_k$ is the eigenvalue of the third matrix, D is a dimension of a space in which the UE is located, and k is an integer.

3. The method of claim 1, wherein the second value is a distance resolution.

4. The method of claim 1, wherein elements of the first matrix are values generated by squaring the values of the measured distances.

5. The method of claim 1, wherein the third matrix is created by the following Equation:

−second matrix×first matrix×second matrix÷2.  [Equation]

6. The method of claim 1, further comprising:
sending a base station a location of one or more anchor nodes at which the first value is a minimum value; and
sending the base station the minimum value of the first value.

7. A user equipment (UE) estimating a location of the UE in a wireless communication system, the UE comprising:
a radio frequency (RF) module configured to transmit and receive a radio signal; and
a processor functionally connected to the RF module,
wherein the processor is configured to:
measure distances between a plurality of anchor nodes and the UE;
create a first matrix using values of the measured distances;
create a third matrix based on the first matrix and a second matrix,
wherein the second matrix is a centering matrix; and
estimate the location of the UE based on a result of comparing a first value generated based on eigenvalues of the third matrix with a second value that is a pre-defined reference value,
wherein when the first value is greater than the second value, all the measured distances are distances measured through a line of sight (LOS) path,
wherein when the first value is less than the second value, some of the measured distances are distances measured through a non-line of sight (NLOS) path.

8. The UE of claim 7, wherein the first value is a value determined by the following Equation:

$$\frac{\lambda_{D+1}}{\sqrt{\sum_{k=1}^{D+1} \lambda_k}}$$  [Equation]

where $\lambda_k$ is the eigenvalue of the third matrix, D is a dimension of a space in which the UE is located, and k is an integer.

9. The UE of claim 7, wherein the second value is a distance resolution.

10. The UE of claim 7, wherein elements of the first matrix are values generated by squaring the values of the measured distances.

11. The UE of claim 7, wherein the third matrix is created by the following Equation:

−second matrix×first matrix×second matrix÷2.  [Equation]

12. The UE of claim 7, wherein the processor is further configured to:
send a base station a location of one or more anchor nodes at which the first value is a minimum value; and
send the base station the minimum value of the first value.

* * * * *